US006454339B2

(12) United States Patent
Wilde et al.

(10) Patent No.: US 6,454,339 B2
(45) Date of Patent: Sep. 24, 2002

(54) POWER OPEN/POWER CLOSE DECK LID

(75) Inventors: Ronald James Wilde, St. Clair Shores; John R. Rice, Clinton Township; Lloyd Walker Rogers, Jr., Shelby Township; David A. Sedlak, Clarkston, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/756,414

(22) Filed: Jan. 8, 2001

Related U.S. Application Data

(60) Provisional application No. 60/189,141, filed on Mar. 14, 2000.

(51) Int. Cl.[7] ................................................ B62D 25/10
(52) U.S. Cl. ............................................ 296/76; 49/280
(58) Field of Search .............................. 296/76; 49/280, 49/324, 334, 336, 348, 349, 357, 360, 362

(56) References Cited

U.S. PATENT DOCUMENTS 2,833,536 A * 5/1958 Joachim et al. ............... 49/280
3,343,303 A * 9/1967 Wanlas ........................ 296/76
4,739,585 A * 4/1988 Pickles ........................ 49/280
4,823,059 A * 4/1989 Compeau et al. ............. 296/76
6,193,300 B1 * 2/2001 Nakatomi et al. ............ 296/76
6,283,530 B1 * 9/2001 Hollerbach .................. 296/76

* cited by examiner

*Primary Examiner*—Joseph D. Pape
*Assistant Examiner*—Lori L Coletta
(74) *Attorney, Agent, or Firm*—Kathryn A. Marra

(57) ABSTRACT

Apparatus for opening and closing a deck lid of a vehicle body. An elongated rack is mounted in a housing for longitudinal movement. A rotatable pinion meshes with the rack to move the rack longitudinally in one direction or the other depending on the direction of rotation of the pinion. A reversible motor rotates the pinion in opposite directions. The deck lid is attached to a pair of arms pivoted to the vehicle body. A link has one end pivoted to the rack and the opposite end pivoted to one of the arms. The deck lid is moved to open position in response to longitudinal movement of the rack in one direction or to closed position in response to longitudinal movement of the rack in the other direction.

10 Claims, 2 Drawing Sheets

POWER OPEN/POWER CLOSE DECK LID

This application claims the benefit of U.S. provisional patent application Ser. No. 60/189,141 filed Mar. 14, 2000.

This invention relates generally to operating apparatus for motor vehicle deck lids and more particularly to apparatus for power opening and power closing a deck lid.

BACKGROUND OF THE INVENTION

Typically the deck lid of a motor vehicle is opened and closed manually. Manual operation is difficult for many people and if the deck lid is operated carelessly, damage to the deck lid and/or the latching mechanism for the deck lid may result. What is needed is a fast and effective power operated apparatus for opening and closing the deck lid.

SUMMARY OF THE INVENTION

In accordance with the present invention, apparatus is provided for the power operation of the deck lid, including a motor, a pinion and rack, and a connection between the rack and the deck lid.

Preferably a guide supports the rack for longitudinal movement. A pinion connected to the output shaft of the motor meshes with the rack to move the rack longitudinally when the pinion is rotated. The connection between the rack and the deck lid includes a link pivoted to the rack and to a deck lid arm and is operative to move the deck lid between open and closed positions in response to longitudinal movement of the rack.

Preferably a clutch is provided which closes automatically upon actuation of the motor and which otherwise is in a released position so that in the event of a loss of power the deck lid may be operated manually.

In a preferred construction about to be described, the guide for the rack is in the form of a tubular housing in which the rack is slidably supported. The housing preferably has an elongated slot in one side wall, with one end of the link pivoted to the rack by a pivot pin movable in the slot. The housing has a window in an opposite side wall through which the pinion extends to mesh with the rack.

One object of this invention is to provide apparatus for the power operation of a deck lid having the foregoing features and capabilities.

Another object is to provide apparatus for power opening and power closing the deck lid which is composed of a relatively few simple parts, is rugged and durable in use, and is easy to operate.

These and other objects, features and advantages of the invention will become more apparent as the following description proceeds, especially when considered with the accompanying claims and drawings.

DETAILED DESCRIPTION OF THE PREFERRED EMBODIMENT

Figure 1:
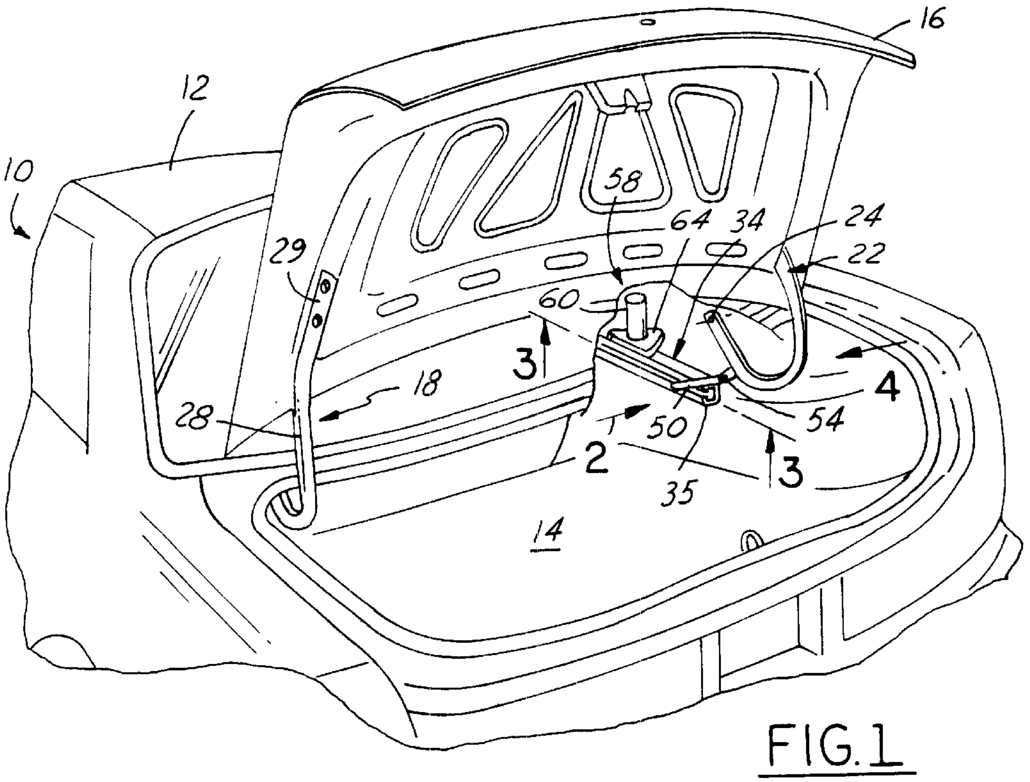
FIG. 1 is a perspective view of the rear of a vehicle having apparatus for power opening and power closing a deck lid, constructed in accordance with the invention.
Figure 2:
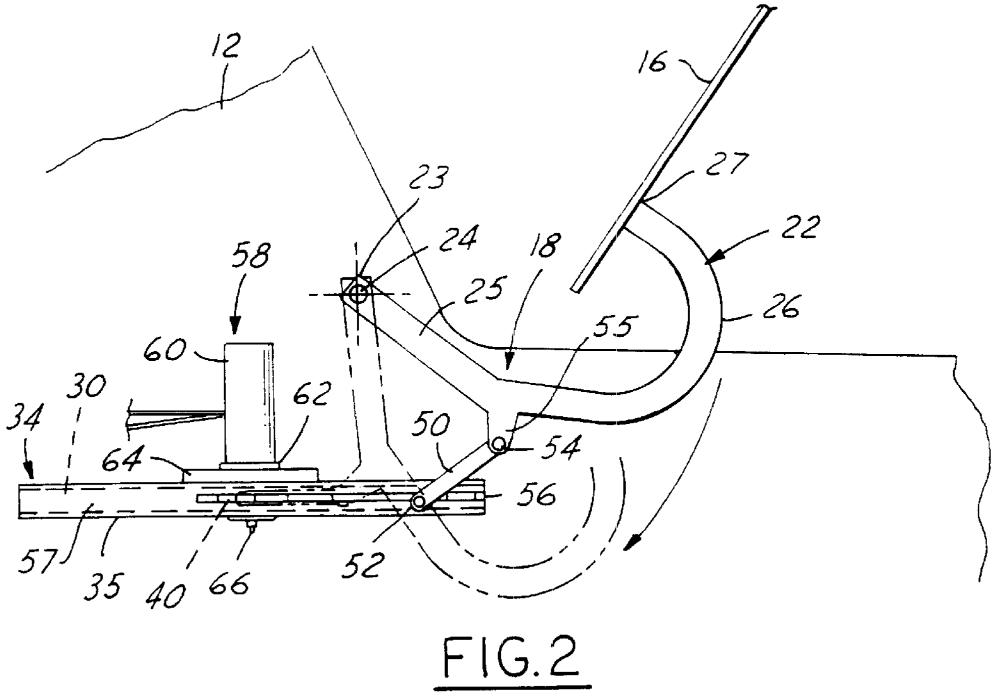
FIG. 2 is an elevational view of the power opening and power closing apparatus, taken in the direction of the arrow 2 in FIG. 1.
Figure 3:
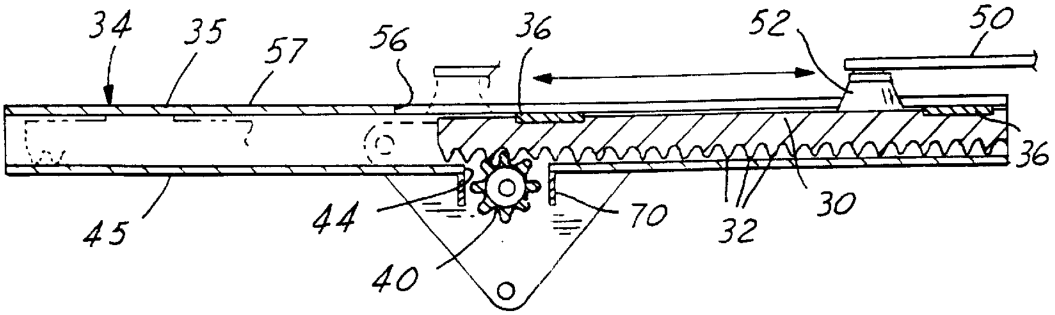
FIG. 3 is a sectional view taken on the line 3—3 in FIG. 1.
Figure 4:
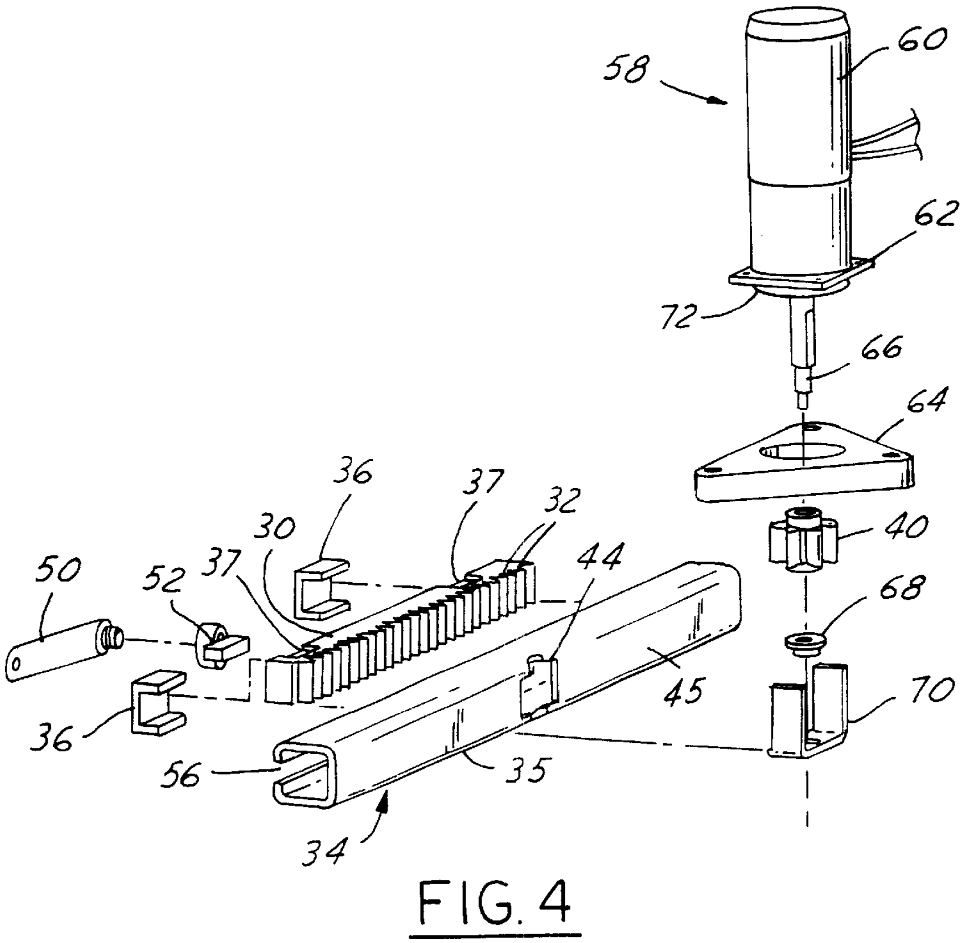
FIG. 4 is an exploded perspective view of the parts of the apparatus, taken in the direction of the arrow 4 in FIG. 1.

Referring now more particularly to the drawings, there is shown a motor vehicle 10 having a body 12 provided with a rear trunk space 14. A deck lid 16 is supported by a first pivoted arm assembly 18 and a second pivoted arm assembly 22 for movement from an open position permitting access to the truck space 14 to a closed position closing access to the trunk space. FIG. 1 shows the deck lid 16 open and FIG. 2 shows the deck lid in an intermediate position.

The pivoted arm assembly 18 includes an arm 28 having one end 29 attached to the trunk lid 16 and one end hinged to the vehicle body 12 by a pivot pin for swinging movement about an axis extending transversely of the vehicle body. The second pivoted arm assembly 22 has a similar arm 25 that also has one end 23 hinged to the vehicle body 12 by a pivot pin 24 for swinging movement about the same transverse axis. The deck lid 16 is rigidly secured to the two arms 25 and 28 at ends 27 and 29 respectively.

The apparatus for swinging the arms, and hence the deck lid, includes an elongated rack 30 of rectangular cross-section having teeth 32 along one side and mounted for longitudinal sliding movement in a rack guide 34 in the form of an elongated tubular housing 35 also of rectangular cross-section. The housing 35 and rack 30 are preferably made of metal, and to reduce friction when the rack is moved in the housing, plastic anti-friction sliders 36 are provided. The sliders 36 are generally channel-shaped and are secured to the rack 30 and ride on the inner surfaces of the housing 35 with very little friction. The sliders 36 embrace the three non-toothed sides of the rack and fit in recessed portions 37 thereof.

The rack 30 is moved longitudinally in the housing 35 by a pinion 40 engaging the teeth 32 of the rack through a window 44 in one side wall 45 of the housing. A link 50 has one end pivoted to the rack 30 by a pin 52 and the opposite end pivoted to a tab 55 of the arm 25 of the pivoted arm assembly 22 by a pivot pin 54. The housing 35 has an elongated slot 56 in the side wall 57 opposite the side wall 45 to clear the pivot pin 52 as the rack moves.

A power unit 58 includes a reversible motor 60 which has a flange 62 secured to a mounting plate 64. The mounting plate is secured to the housing 35 and the pinion 40 is secured to the output shaft 66 of the motor. The end of the output shaft 66 extends into a fitting 68 held in a bracket 70 to stabilize the output shaft. The bracket 70 is rigidly secured to the housing 35. Preferably the motor includes a clutch 72 which is normally in a released position so that the deck lid 16 may be opened and closed manually in the event of a power failure, but which closes automatically in response to actuation of the motor 60. The motor is actuated by a suitable control readily accessible to the operator of the vehicle, such, for example, as a hand-held fob (not shown) of the type used to carry the vehicle keys. The control is such that when the deck lid 16 is closed operation of the motor 60 rotates the pinion 40 in one direction to move the rack 30 in a direction to open the deck lid, and when the deck lid is open the control reverse rotates the motor to move the rack in the opposite direction.

The apparatus of this invention has only three moving parts, namely, the motor 60, the rack 30 and the pinion 40, is light in weight and easy and economical to manufacture and assemble. The apparatus preferably is arranged with the housing horizontal and extending lengthwise of the vehicle body for convenient packaging in a small area alongside a deck lid hinge arm.

What is claimed is:

1. Apparatus for moving a deck lid of a vehicle body towards at least one of its open and closed positions comprising:

an elongated rack, means mounting said rack on the vehicle body for longitudinal movement, a pinion in mesh with said rack to move said rack longitudinally upon rotation of said pinion, a power unit for rotating said pinion, and means providing a connection between the rack and the deck lid to move the deck lid towards said one of its open and closed positions in response to longitudinal movement of said rack, the means providing a connection between the rack and the deck lid including a link, said rack being pivoted to one end of the link, and means on said deck lid pivoted to an opposite end of the link.

2. Apparatus for moving a deck lid of a vehicle body towards at least one of its open and closed positions comprising:

an elongated rack, means mounting said rack on the vehicle body for longitudinal movement, a pinion in mesh with said rack to move said rack longitudinally upon rotation of said pinion, a power unit for rotating said pinion, and means providing a connection between the rack and the deck lid to move the deck lid towards said one of its open and closed positions in response to longitudinal movement of said rack, the means providing a connection between the rack and the deck lid including an arm attached to the deck lid and pivoted to the vehicle body, and a link having opposite ends pivoted respectively to the rack and to the arm.

3. Apparatus for opening and closing a deck lid of a vehicle body comprising;

an elongated rack, a guide mounting said rack on the vehicle body for longitudinal movement, a rotatable pinion in mesh with said rack to move the rack longitudinally in one direction or the other depending on the direction of rotation of the pinion, a power unit having a reversible motor for rotating said pinion in opposite directions, and means providing a connection between the rack and the deck lid to move the deck lid to open position in response to longitudinal movement of the rack in said one direction or to move the deck lid to closed position in response to longitudinal movement of the rack in the other direction, the means providing a connection between the rack and the deck lid comprising an arm secured to the deck lid and having one end pivoted on the vehicle body, and a link having one end pivoted to the rack and an opposite end pivoted to the arm.

4. Apparatus as defined in claim 3, wherein said guide comprises an elongated tubular housing in which said rack is slidably supported, said housing having an elongated slot in a first side wall, said one end of said link is pivoted to the rack by a pivot pin movable in said slot, and said housing having a window in a second side wall opposite said first side wall through which said pinion extends to mesh with said rack.

5. Apparatus as defined in claim 4, further including anti-friction sliders on said rack facilitating sliding movement of said rack in said housing.

6. Apparatus as defined in claim 5, wherein said housing is arranged horizontally and extends lengthwise of the vehicle body.

7. Apparatus for opening and closing a deck lid of a vehicle body comprising;

an elongated rack, a guide mounting said rack on the vehicle body for longitudinal movement, a rotatable pinion in mesh with said rack to move the rack longitudinally in one direction or the other depending on the direction of rotation of the pinion, a power unit having a reversible motor for rotating said pinion in opposite directions, and a connection between the rack and the deck lid to move the deck lid to open position in response to longitudinal movement of the rack in said one direction or to move the deck lid to closed position in response to longitudinal movement of the rack in the other direction, the connection including an arm secured to the deck lid and having one pivoted on the vehicle body and a link having one end pivoted to the rack and an opposite end pivoted to the arm.

8. Apparatus as defined in claim 7, wherein the guide comprises an elongated tubular housing in which the rack is slidably supported, the housing has an elongated slot in a first side wall, the one end of the link is pivoted to the rack by a pivot pin movable in the slot, and the housing has a window in a second side wall opposite the first side wall through which the pinion extends to mesh with the rack.

9. Apparatus as defined in claim 8, wherein the housing is arranged horizontally and extends lengthwise of the vehicle body.

10. Apparatus as defined in claim 9, further including anti-friction sliders on the rack facilitating sliding movement of the rack in the housing.

* * * * *